July 25, 1961
H. P. HENRY
2,993,568
HYDRAULIC TRAILER BRAKE AND COUPLING APPARATUS
Filed Sept. 8, 1958
2 Sheets-Sheet 1
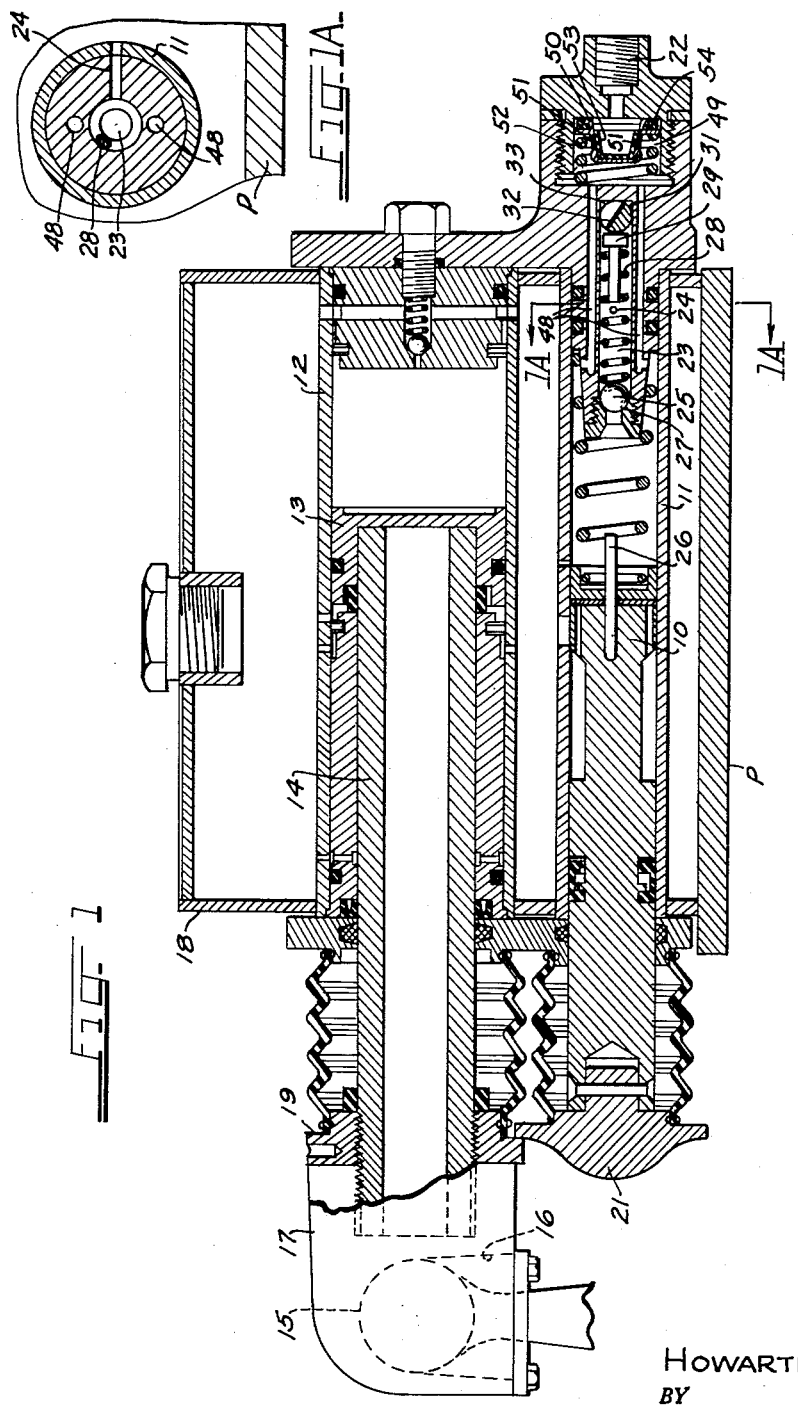
INVENTOR.
HOWARTH P. HENRY
BY
Kegan, Bellamy & Kegan
ATTYS.

July 25, 1961 H. P. HENRY 2,993,568
HYDRAULIC TRAILER BRAKE AND COUPLING APPARATUS
Filed Sept. 8, 1958 2 Sheets-Sheet 2
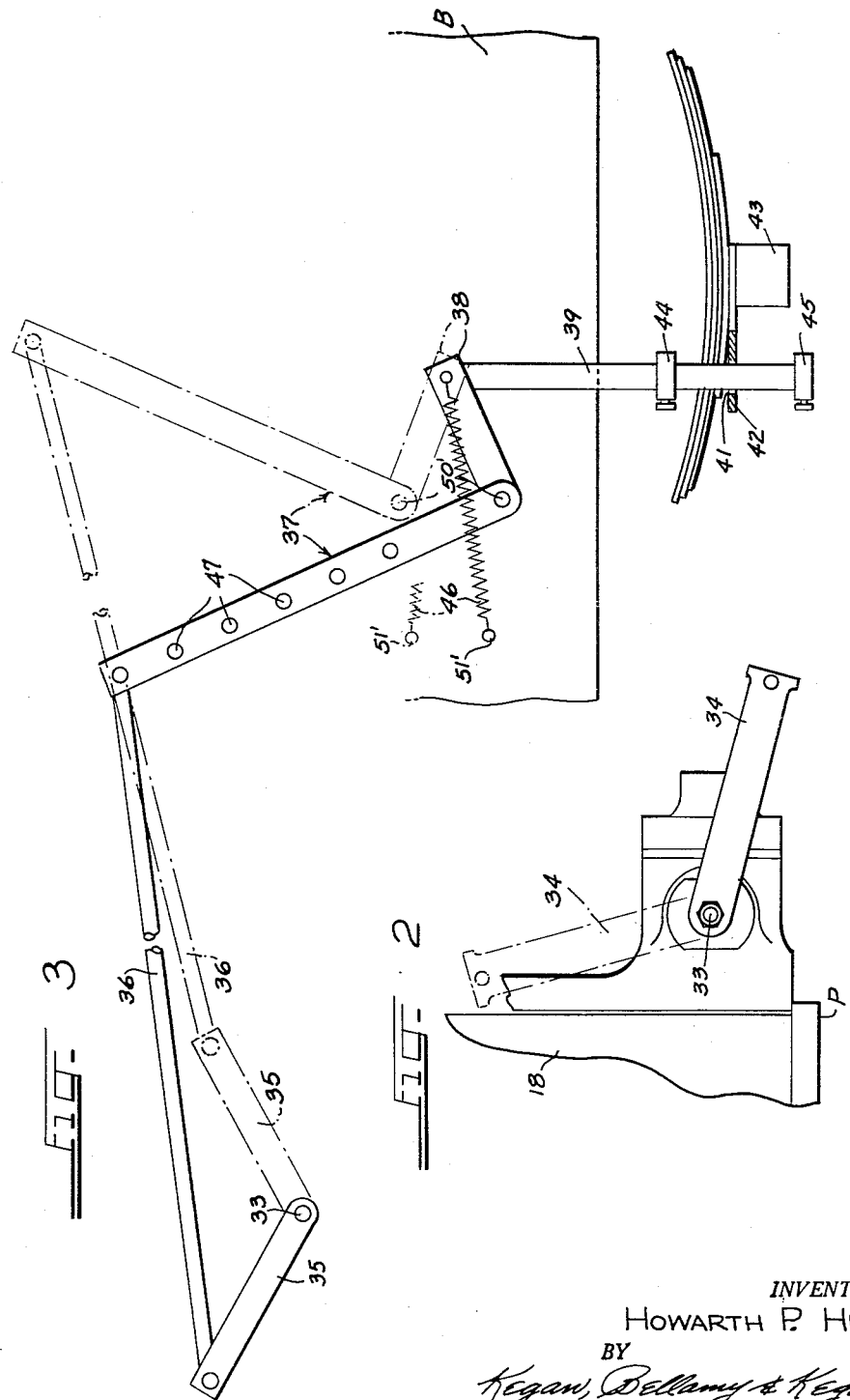
INVENTOR.
HOWARTH P. HENRY
BY
Kegan, Bellamy & Kegan
ATT'YS.

United States Patent Office 2,993,568
Patented July 25, 1961

2,993,568
HYDRAULIC TRAILER BRAKE AND COUPLING APPARATUS
Howarth Padgett Henry, 140 W. 42nd St., New York, N.Y.
Filed Sept. 8, 1958, Ser. No. 759,483
Claims priority, application Great Britain Sept. 12, 1957
5 Claims. (Cl. 188—112)

This invention relates to road vehicle towing apparatus comprising means for actuating the towed vehicle brakes, and more particularly to an improvement in the coupling hitch disclosed in my British Patent No. 714,400, and my corresponding United States Patent No. 2,698,069.

These patents disclose a combined trailer braking and coupling hitch apparatus for a towing-trailer vehicle combination, of the type in which means are provided for controlling liquid-pressure braking mechanism on the trailer vehicle in accordance with the relative movement of the two vehicles in their line of travel, the coupling hitch apparatus including a cylinder, a piston movable in the cylinder during relative movement of the vehicles towards each other in their line of travel, brake actuating means in the trailer vehicle operated by liquid expelled from said cylinder by such movement of the piston, a liquid reservoir, a spring-loaded valve controlling the escape of liquid from the cylinder to the reservoir through a connecting passage, and means to maintain said valve open mechanically when the piston moves in the cylinder a predetermined distance during a backing-up operation.

It will be evident that the loading spring of the valve must exert a thrust sufficient to prevent opening of the valve until the pressure in the cylinder exceeds that which is sufficient to give effective application of the brakes, but must not be so strong that the trailer wheels will slide during a backing-up operation owing to failure of the liquid to escape from the cylinder. The limits between which the spring thrust must lie will vary with the weight of the trailer, and the object of the present invention is to render the brake actuating means effective when used with a trailer the weight of which may at times be substantially increased by a load carried thereon.

According to the invention in a combined trailer braking and coupling hitch apparatus for a towing-trailer vehicle combination according to the listed patents, the loading spring of the spring-loaded valve is adjustable to vary the thrust urging the said valve onto its seat.

Preferably, a movable abutment is provided for the loading spring, and the said movable abutment may comprise a cam-like member rotatable about an axis perpendicular to the axis of the spring.

The invention is hereinafter described with reference to the accompanying drawings, in which:

FIGURE 1 is a sectional elevation showing one embodiment of the invention;

FIGURE 1A is a sectional view taken along line 1A—1A in FIGURE 1;

FIGURE 2 is a front elevation corresponding to part of FIGURE 1, showing manual means for operating the movable abutment for the valve spring; and FIGURE 3 shows, somewhat diagrammatically, means for effecting automatic changes of the position of the movable abutment with changes of the loading of the trailer vehicle.

Referring to FIGURE 1, towing and brake-applying structure is shown mounted on platform P, which corresponds to platform 31 of my cited United States patent, being fixedly attached to the trailer vehicle. Such structure includes a brake operating piston 10, slidably mounted in a master cylinder 11 parallel to a second cylinder 12 in which is slidable another piston 13 fixed on a traction rod 14 adapted to be coupled at its forward end to a towing vehicle, for example by engagement of a ball head 15 carried by the towing vehicle in a downwardly opening socket 16 in a block 17 carried by the said traction rod 14. The said other piston 13 and its cylinder 12 constitute a damper to control the rate of relative movement of the vehicles. Both cylinders 11 and 12 are sleeve-like tubes mounted within a box-like housing 18 carried by platform P of the trailer vehicle and serving as a reservoir for liquid co-operating with both the brake master cylinder 11 and the damper cylinder 12.

The traction rod 14 carries a flange 19 which co-operates with an operating head 21 on a portion of the brake piston 10 projecting from the housing 18, so that the said brake piston 10 is urged into the brake master cylinder 11 when the vehicles approach one another.

The brake master cylinder 11 is connected at 22 by a conduit (not shown) to wheel cylinders (not shown) having pistons acting on the shoes or equivalent braking members and is also connected to the reservoir through passages 23, 24, in the former of which is mounted a spring-loaded ball valve 25. A pin 26 carried by the brake piston 10 is arranged to engage the ball valve 25 and hold it off its seat 27 when the said piston has travelled a predetermined distance into the brake cylinder.

The loading spring 28 of the ball valve 25 is a coiled compression spring which engages at one end, with the ball valve, and at its other end engages a button member 29 which rests against a cam-like member 31 rotatable about an axis perpendicular to the axis of the spring 28, the cam-like member 31 being conveniently formed by machining a flat 32 on one end of a cylindrical spindle 33. The said spindle 33 is rotatable between two positions in one of which the button member rests against the flat on the spindle, and in the other of which the button rests against the rounded surface of the spindle, as shown in FIGURE 1, so that, in the latter position, the spring 28 is subjected to a greater initial compression than in the former position.

The displaced liquid reaches the wheel cylinders through passages 48, chamber 49, and outlet 22. Chamber 49 communicates with outlet 22 through openings 51 in auxiliary valve body 50, which has a rubber sealing ring 54 recessed in its seating face, with which it is held lightly in contact by spring located in chamber 49 which yields to permit backward flow of the braking fluid when the master cylinder pressure is lowered. Backward flow through openings 51 is prevented by rubber cup 53 within valve body 50, which cup yields to permit the forward braking flow of liquid.

When the trailer vehicle tends to overrun the towing vehicle, the brake piston 10 is forced into the brake master cylinder 11, and displaces liquid into the wheel cylinders to apply the trailer brakes. The degree of application of the trailer brakes depends on the forward thrust exerted by the trailer vehicle on the towing vehicle which thrust depends on both the weight of the trailer and the amount of retardation of the towing vehicle. When both these are at their maximum, the forward thrust is the product of the line pressure required to operate the trailer brakes under these conditions, multiplied by the area of the piston 10. For safety, valve loading spring 28, which, when open, allows liquid to escape to the reservoir through side opening 24, must be set to yield at a pressure higher than the maximum required by high retardation and full trailer load. The present invention, by providing for the described adjustment at 32, 33 of the initial loading of the spring 28, enables this maximum to be adjusted to suit the trailer load.

The pin 26 carried by the brake piston 10 acts, when the towing vehicle is backed up towards the trailer vehicle, to open the valve 25, and hold it open, to release the trailer brakes, so that the trailer can then be backed freely. The maximum thrust between the vehicles at which the valve spring 28 yields must evidently be sufficiently low to allow the valve to open before the trailer wheels slide on the ground, but high enough to ensure that the trailer brakes are fully applied before the valve opens, and the adjustment of the initial loading of the spring enables it to be set for different maximum thrust values depending on whether the trailer vehicle is loaded or unloaded.

The cam spindle 33 having the cam-like member 31, 32 thereon may be operated manually by a hand lever 34 (FIGURE 2) fixed to the end of the said spindle 33, or may be operated automatically in accordance with the loading of the trailer vehicle.

The lever 34 is shown in full lines in FIGURE 2 in the position corresponding to the position of cam spindle 33 in FIGURE 1, when the initial loading of the spring 28 is at its higher value, 29 riding on round portion 31, and is shown in chain-dotted lines in the lower-tension position in which the button member 29 engages the flat portion 32, the initial loading of the spring 28 then being at its lower value.

Automatic operation may be effected by relative movement of the trailer body and axle due to changes of load, a suitable mechanism for this purpose being shown in FIGURE 3. A lever 35, corresponding to the lever 34 but having a suitable different angular relation to the cam 31, 32 is mounted on cam spindle 33, and is connected by a rigid link 36 to a second lever 37, conveniently a bell-crank lever mounted on pivot 50 fixed with the trailer body. One arm 38 of lever 37 carries a dependent rod 39 passing through a hole 41 in a stop-plate 42 carried by the trailer axle 43, the rod 39 having mounted on it two collars 44 and 45, one above and one below the stop plate. The structure is shown in FIGURE 3 in full lines in the full-braking position thereof when the trailer is loaded, and in chain-dotted lines in the light-braking position thereof when the trailer is unloaded.

The bell-crank lever 37, which is carried by pivot 50′ mounted on the load bearing trailer body member B, has associated with it a snap-over spring 46, anchored at 51′ to the trailer body, which tends to move it to one or other of two extreme positions.

The collars 44 and 45 are so positioned on the dependent rod 39 that, when the trailer vehicle is unloaded, the consequent rising of 51′ and 50′ carries rod 39 upwardly until the lower collar 45 is engaged and held down by the stop plate 42, rotating the bell-crank lever 37, in a clockwise direction as shown in the drawing, past a mean position so that the snap-over spring 46 takes charge and pulls the said bell-crank lever clockwise to its extreme position, the said bell-crank lever, acting through the link 36, rotating cam spindle 33 to the position in which the button member 29 engages the flat surface 32 to apply the lower tension to valve spring 28 for relatively light maximum braking action. Parts 35 to 39; 44, 45; and 50′, 51′ then occupy their respective positions shown in chain-dotted lines.

When the trailer is loaded up to a predetermined weight, the body moves downwardly relative to the axle 43, carrying pivot 50′ downwardly. The stop plate 42 then acts on the upper collar 44 carried by rod 39 to move the bell-crank lever 37 anti-clockwise back to its other extreme position, shown in full lines, in which the curved surface of the cam-like member 31 engages the button member 29, and the initial loading of the spring 28 is increased to provide relatively high maximum braking action.

The described two-position automatic adjustment is particularly useful in connection with trailer vehicles for carrying loads of substantially constant weight, such as boats, which may have a weight greater than that of the trailer itself.

The positions of the collars 44, 45 on the dependent rod 39 may be adjustable to enable the automatic operating mechanism to be adjusted to correspond to the spring deflection of a given trailer vehicle under load. Moreover, the rigid link 36 may be connected to the bell-crank lever at any one of a number of points 47 along the length of the latter to enable the required angle of movement of the cam to be obtained with different spring deflections, so that a standard linkage can be adapted to various different trailer vehicles.

While I have described above the principles of my invention in connection with specific apparatus, it is to be clearly understood that this description is made only by way of example and not as a limitation to the scope of my invention.

I claim:

1. A trailer-tractor hitch and braking device for use with a trailer having a brake cylinder, comprising a master cylinder, a piston registering with and slidably movable in said master cylinder in accordance with the relative movement between said trailer and tractor, means connecting said master cylinder to said brake cylinder, a variable pressure relief valve having an inlet connected to said master cylinder, said relief valve being opened upon said master cylinder pressure exceeding a predetermined value, and a member actuated in accordance with the load on said trailer for varying the said relief valve opening pressure.

2. A trailer-tractor hitch and braking device for use with a trailer having a brake cylinder comprising a master cylinder mounted on said trailer, a piston registering with said master cylinder and slidable therein in response to relative movement between said tractor and trailer, means connecting said master cylinder to said brake cylinder, a brake fluid reservoir, means including a variable pressure relief valve connected between said master cylinder and said reservoir, said relief valve being opened upon said master cylinder pressure exceeding a predetermined value, and a member actuated in accordance with the load on said trailer for varying the required relief valve opening pressure.

3. A trailer-tractor hitch and braking device for use with a trailer having a brake cylinder, comprising a master cylinder piston registering with and slidably movable in said master cylinder in accordance with the relative movement between said trailer and tractor, means connecting said master cylinder to said brake cylinder, a brake fluid reservoir, means including a normally closed compression spring loaded relief valve affording communication between said master cylinder and said reservoir, said relief valve being opened upon said master cylinder pressure exceeding a predetermined value, and a member actuated in accordance with the load on said trailer for varying the compression of said check valve spring.

4. A trailer braking device for use with a tractor drawn trailer including a brake cylinder, an axle and a load bearing body member spring mounted on said axle, comprising a master cylinder in fluid communication with said brake cylinder, a piston slidably registering with said master cylinder and motivated by the relative movement between said tractor and trailer, variable pressure relief valve having an inlet connected to said master cylinder and being opened upon said cylinder pressure exceeding a predetermined value and means actuated by the movement of said body member relative to said axle for varying the said relief valve opening pressure.

5. A trailer-tractor hitch and braking device for use with a trailer having a brake cylinder, comprising a master cylinder, a piston registering with and slidably movable in said master cylinder in accordance with the relative movement between said trailer and tractor, means connecting said master cylinder to said brake cylinder, a brake fluid reservoir, means including a normally closed compression spring loaded relief valve affording communication between said master cylinder and said reservoir, said relief valve being opened upon said master cylinder pressure exceeding a predetermined value, a cam member acting upon an end of said spring, a spindle extending from said cam member and rotatable therewith, and a lever affixed to said spindle and rockable in response to the weight on said trailer for varying the required relief valve opening pressure.

References Cited in the file of this patent

UNITED STATES PATENTS

| | | |
|---|---|---|
| 2,001,630 | Pepper | May 14, 1935 |
| 2,066,893 | Linsowe | Jan. 5, 1937 |
| 2,698,069 | Henry | Dec. 28, 1954 |
| 2,746,574 | Smith et al. | May 22, 1956 |
| 2,834,436 | Davids | May 13, 1958 |
| 2,846,030 | Wade | Aug. 5, 1958 |
| 2,848,074 | Puddy | Aug. 19, 1958 |